United States Patent [19]

McMann et al.

[11] 3,838,811
[45] Oct. 1, 1974

[54] BURNER CONTROL CIRCUIT
[75] Inventors: Wilbur S. McMann, Utica; Charles Stang, Jr., Detroit, both of Mich.
[73] Assignee: Maxitrol Company, Southfield, Mich.
[22] Filed: Apr. 4, 1973
[21] Appl. No.: 347,618

[52] U.S. Cl. .................. 236/10, 236/21 B, 236/78
[51] Int. Cl. ............................................. F24d 5/00
[58] Field of Search .......... 236/9 R, 10, 21 B, 78 R; 317/135

[56]         References Cited
          UNITED STATES PATENTS

| 2,383,401 | 8/1945  | Mantz .............................. 236/21 B |
| 2,672,291 | 3/1954  | Rifle ................................... 236/9 |
| 2,720,254 | 10/1955 | Ward ......................... 317/135 R X |
| 3,486,693 | 12/1969 | Stang, Jr. et al. ................... 236/9 A |
| 3,525,907 | 8/1970  | Abromaitis .................... 317/135 X |

*Primary Examiner*—William E. Wayner
*Attorney, Agent, or Firm*—Harness, Dickey & Pierce

[57]                  ABSTRACT

A novel control circuit for heating and heating/cooling systems wherein in a heating mode the circuit controls a valve means comprising a main valve and a modulating valve through which gas is supplied to a burner. The main valve is a normally closed, solenoid-actuated type which opens when its coil is energized, and energization of its solenoid is controlled by a pair of normally open relay contacts connected in series. One of the contacts closes when the temperature in the space being heated drops below a preset temperature. The other contact remains closed so long as the temperature in the space being heated remains below a maximum limit. In a heating/cooling system the circuit is selectively operatively coupled with the valve means and a refrigeration unit. When heating is selected, the circuit operates as mentioned above. In cooling, a cooling solenoid of the refrigeration unit is energized when the temperature in the space being cooled rises above a preset temperature. A blower and blower control are also controlled such that the blower can operate either automatically whenever the refrigeration unit operates or continuously in either heating, cooling, or off. The circuit can be installed with a minimum number of wires connecting the temperature setting and sensing control unit with the control circuit module. A feedback circuit in the control circuit prevents the control circuit from pulsing the refrigeration unit when the desired temperature in the space being cooled is reached.

31 Claims, 5 Drawing Figures

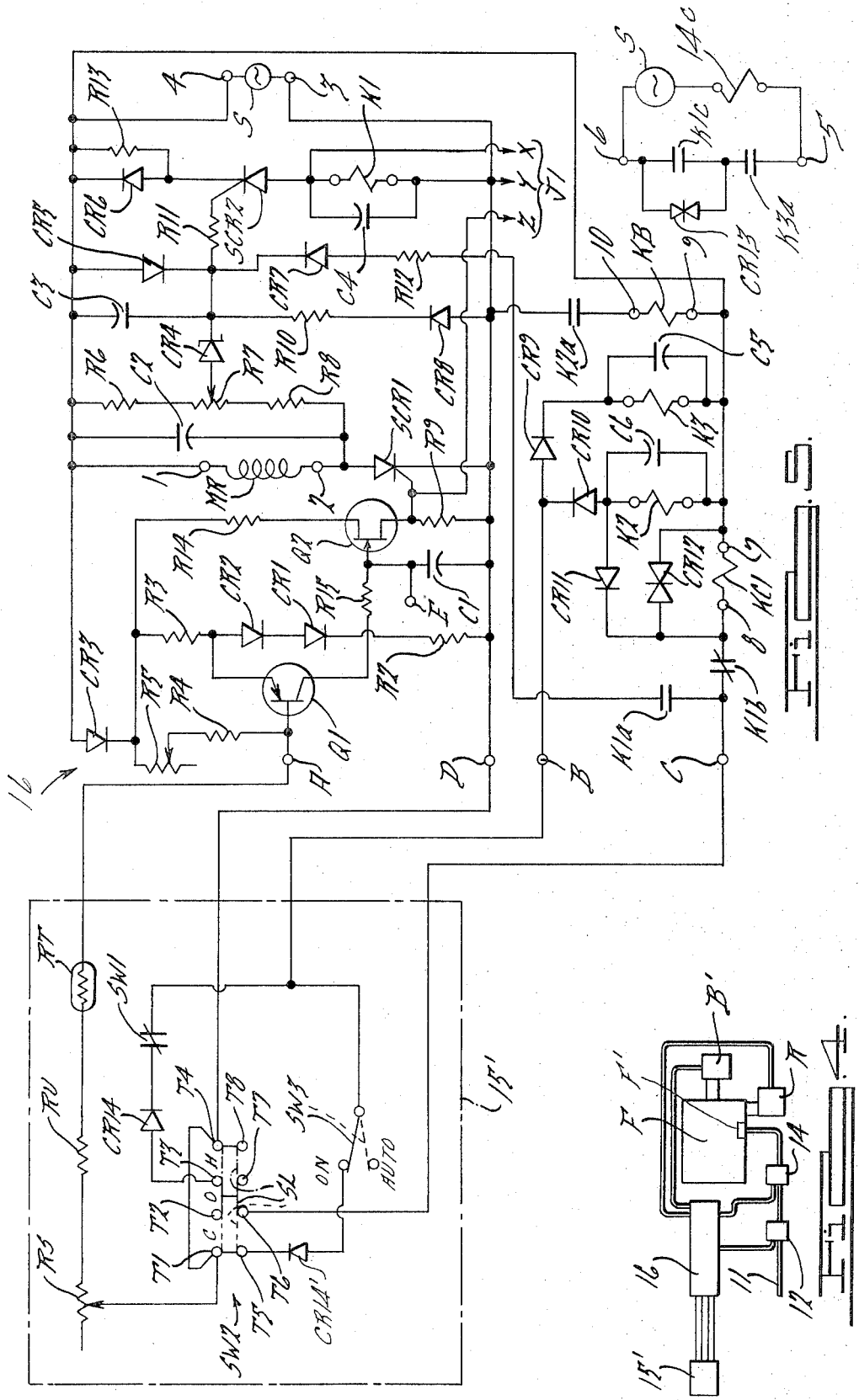

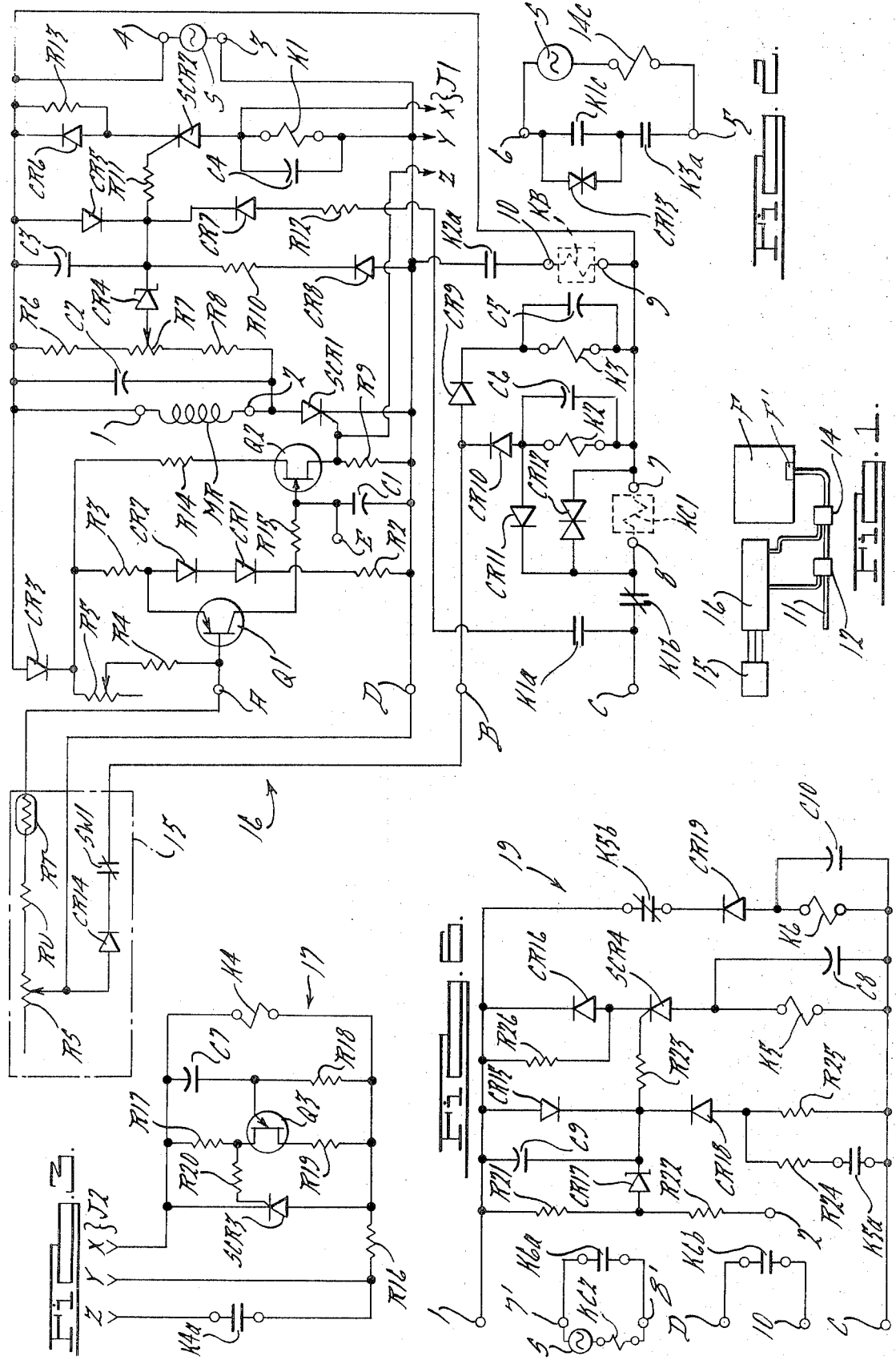

BURNER CONTROL CIRCUIT

BACKGROUND AND SUMMARY OF THE INVENTION

The present invention relates to heating and heating-/cooling systems and in particular to improved control circuits for such systems.

In U.S. Pat. No. 3,486,693 assigned to the same assignee as the present application, there is disclosed a control circuit for regulating the energy input to a gas burner via an on-off type main valve and a modulating valve which are connected in series between a source of gas and the burner. The latter valve is normally open while the former is normally closed. The control circuit operates to open the main valve when the temperature in the space to be heated by the burner drops below a preselected temperature. With the main valve open, the control circuit modulates the modulating valve to thereby modulate the flow of gas to the burner in accordance with a control signal representing the difference between the actual temperature and the desired temperature in the space being heated. In this way, the burner provides heat input which just balances the heat loss, and the temperature in the space being heated is maintained substantially at its desired value in spite of variation in the rate of heat loss. The control circuit can also be used to provide control of a refrigeration unit and associated blower which cool the same space during the cooling season.

One aspect of the present invention involves an improvement in a control circuit of the type illustrated in this prior patent. An important advantage of the present invention is that a single control circuit module is compatible with both heating and heating/cooling systems. Thus where a heating system having a control circuit module according to the present invention is initially installed in a building, the module does not have to be replaced when a cooling system is added. Moreover, in a further aspect of the invention, this control module can be used with an add-on two-stage cooling control circuit module to accommodate a two-stage cooling system. Another important advantage is that the wiring connecting the temperature selecting and setting module, which is located in the space being heated or cooled, with the control module, which is located near the burner, is simplified. Only three conductors are required for a heating system and only four conductors for a heating/cooling system. This is important because it facilitates installation at the job site and reduces the possibility of having the wiring improperly connected.

Another aspect of the present invention involves the provision of a novel control circuit for heating and heating/cooling systems. Because of the advantageous circuit operation attained through the novel configuration of circuit elements, not only is the on-site wiring between the temperature selecting and setting circuit module and the control circuit module greatly simplified as mentioned above, but also reliable control of multiple functions is provided with the room occupant having only to select the desired room temperature. The control circuit can provide either cyclical or continuous operation of the blower in accordance with the desire of the room occupant. The operation of heating and heating/cooling systems by the control circuit of the present invention provides well-regulated temperature control of space to be heated or cooled. Furthermore, electronic circuit construction provides high reliability and fast response.

The foregoing advantages along with additional features and benefits of the invention will be seen in the ensuing desription and claims which are to be taken in conjunction with the accompanying drawings.

BREIF DESCRIPTION OF THE DRAWINGS

The drawings illustrate a preferred embodiment of the invention in accordance with the best mode presently contemplated for carrying out the invention.

FIG. 1 is a schematic block diagram illustrating a heating system incorporating the control circuit of the present invention.

FIG. 2 is a schematic electronic circuit diagram of the control circuit of FIG. 1.

FIG. 3 is a schematic electronic circuit diagram of a time-delay circuit which may be used in conjunction with the control circuit of FIG. 2.

FIG. 4 is a schematic block diagram of a heating-/cooling system incorporating the control circuit of the present invention.

FIG. 5 is a schematic electronic circuit diagram of the control circuit of FIG. 4.

FIG. 6 is a schematic electronic circuit diagram of a two-stage cooling control circuit which may be used in conjunction with the control circuit of FIG. 5.

DESCRIPTION OF THE PREFERRED EMBODIMENT

Looking first at FIG. 1, a gas supply line 11 is coupled through a modulating valve 12 and a main "on-off" valve 14 to a burner F' of a furnace F. Furnace F supplies heat to a space to be heated, for example the interior of a building. Valves 12 and 14 are controllably operated by a control circuit module 16 of the present invention in accordance with a control signal supplied from a temperature sensing and temperature setting circuit module 15 located in the building space heated by furnace F. Module 16 is preferably located in proximity to valves 12 and 14. Valve 14 is a conventional solenoid-actuated "on-off" type, and valve 12 may be of the type disclosed in U.S. Pat. No. 3,317,136 assigned also to the same assignee as the present application. Details of valves 12 and 14 are thus omitted from the present disclosure for sake of simplicity. When the solenoid of valve 14 is not being energized, valve 14 is closed. When the modulating coil of valve 12 is not being energized, valve 12 is open.

Briefly, the heating system operates as follows. As the building temperature as sensed by circuit 15 changes, so does the control signal supplied to circuit 16. When he building temperature drops below a preselected temperature as set at circuit 15, circuit 16 energizes the solenoid of valve 14 thereby opening the valve. At this time the modulating coil of valve 12 is essentially "fully energized" thereby operating valve 12 to a "fully closed" position. (Note: there is some minimum flow through valve 12 when "fully closed." If the building temperature continues to drop, the modulating coil of valve 12 is decreasingly energized thereby permitting increased gas flow to burner F', and hence providing greater heat input to the building space from furnace F. As the building temperature rises, the system operates in the reverse fashion. In this way, the temperature of the building is well-regulated to the desired temperature with just enough heat being supplied to balance the building heat loss even though the rate of heat loss may vary.

Details of circuits 15 and 16 are shown in FIG. 2. Control circuit 16 is constructed as a single control module and has various terminals available for external connection to other system components. These terminals are identified by the letters A, B, C, D, and E and by the numerals 1, 2, 3, 4, 5, 6, 7, 8, 9 and 10. Terminals 3 and 4 are connected to a source of conventional AC power S which is amplitude-reduced from the customary line level by transformer action. Terminal 4 connects directly with terminals 1, 7 and 9; terminal 3 directly with terminal D. Terminals A, D and B are electrically coupled via only three conductors with circuit 15.

Circuit 15 comprises a thermistor RT, a resistor RU, a potentiometer RS, a diode CR14 and a safety switch SW1. Thermistor RT, resistor RU, and potentiometer RS are connected in a series circuit between terminals A and D, as illustrated. Diode CR14 and safety switch SW1 are connected in a series circuit between terminals D and B with diode CR14 being arranged to conduct current in the direction from terminal D to terminal B.

Circuit 16 comprises a diode CR3 which supplies rectified AC power from source S to an amplifying circuit portion comprising a PNP transistor Q1 and a unijunction transistor Q2. The anode of diode CR3 connects to terminal 4 while its cathode connects through a calibrating potentiometer R5 and a resistor R4 to terminal A. The base terminal of transistor Q1 connects to terminal A and the emitter terminal through a resistor R3 back to the cathode of diode CR3. The cathode of diode CR3 also connects through a resistor R14 to the B1 terminal of unijunction transistor Q2. The collector terminal of transistor Q1 connects through a resistor R15 to the emitter terminal of unijunction transistor Q2. The B2 terminal of unijunction transistor Q2 connects through a resistor R9 to terminal D. A capacitor C1 connects the emitter terminal of transistor Q2 to terminal D, and the emitter of transistor Q1 connects through a pair of diodes CR2, CR1 and a resistor R2 also to terminal D. The anode-cathode circuit of a silicon controlled rectifier SCR1 connects from terminal 2 to terminal D. The gate of SCR1 connects to the B2 terminal of unijunction transistor Q2. The modulating coil MR of modulating valve 12 is connected to terminals 1 and 2.

A capacitor C2 connects between terminal 1 and terminal 2 and is in parallel with coil MR. A series string composes of a resistor R6, a potentiometer R7 and a resistor R8 also connects in parallel with capacitor C2 and coil MR. The wiper of potentiometer R7 connects through a zener diode CR4 and through a resistor R11 to the gate of a second silicon controlled rectifier SCR2. A capacitor C3 and a diode CR5 connect between terminal 4 and the junction of diode CR4 and resistor R11. A diode CR8 connects in series with a resistor R10 from terminal D to the junction of diode CR4 and resistor R11. The cathode of SCR2 connects through the parallel combination of a diode CR6 and a resistor R13 to terminal 4. The anode of SCR2 connects through the coil K1 of a relay to terminal 3. The portion of circuit 16 thus far described is generally the same as that disclosed in the aforementioned U.S. Pat. No. 3,486,693 and further details may be had from that disclosure.

However, there is one difference which should be presently noted. The difference involves the way in which the signal for modulating coil MR is developed. In the present circuit the potentiometer RS used to set the desired building temperature and the thermistor RT for sensing the actual building temperature are connected in series in the base-collector circuit of transistor Q1. Calibration potentiometer R4 and resistor R5 are connected in series in the baseemitter circuit of transistor Q1. Thus these two potentiometers, two resistors, and thermistor constitute a voltage dividing network forming the input circuit of transistor Q1. For a selected temperature as set on potentiometer RS, an increasing building temperature as sensed by thermistor RT causes the input voltage at the base of transistor Q1 to become less positive and this results in increasing energization of coil MR. Similarly a drop in building temperature causes the base voltage at transistor Q1 to become more positive, and this results in coil MR being decreasingly energized. As a result, value 12 is modulated toward a more restricting position as the building temperature rises toward its desired value, and to a less restricting position as the building temperature falls from its desired value. As the amount of resistance of potentiometer RS in circuit is increased by movement of its wiper, the voltage at the base of transistor Q1 becomes more positive; when the amount of resistance of potentiometer RS in circuit decreases, the voltage at the base of transistor Q1 becomes less positive. Therefore, by increasing the amount of resistance RS in circuit, the desired building temperature is raised; by decreasing the amount of resistance of potentiometer RS in circuit, the desired building temperature is lowered. Potentiometer R5 is set to calibrate potentiometer RS so that the actual building temperature is made to correspond to the setting of potentiometer RS, as read on a graduated dial associated with potentiometer RS. (Details of the operation of diode CR14 and switch SW1 will be explained later.)

Operation of the circuit thus far described may be briefly summarized as follows. Whenever the building temperature as sensed by thermistor RT drops below the temperature set on potentiometer RS, SCR2 conducts on half cycles of voltage of source S wherein terminal 3 is of positive polarity relative to terminal 4. As a result relay coil K1 is energized. As long as the actual building temperature as sensed by thermistor RT remains below this level, coil K1 remains energized. As the temperature in the building continues to drop below the desired temperature preset on potentiometer RS, coil MR is decreasingly energized thereby increasingly opening valve 12 to provide greater gas flow to burner F'. As the building temperature rises, valve 12 is increasingly restricted to reduce gas flow. When the temperature rises above that to which potentiometer RS is set, coil K1 de-energizes. In this way the control circuit operates in tune with the rest of the system to maintain the building temperature at substantially that preset on potentiometer RS. The modulating range for modulating valve 12 is such that coil MR goes from full energization to full de-energization in response to a 3° temperature differential between that set on potentiometer RS and that sensed by thermistor RT. Once the building temperature is substantially at its desired level, furnace F is matching the heat loss from the building to thereby maintain the desired temperature in spite of variations in the heat loss rate.

According to one of the novel features of the present arrangement, circuit 16 comprises the following circuit construction for energizing main valve 14. Circuit 16 includes a normally open relay contact K1c operatively associated with relay coil K1 and a normally open relay contact K3a operatively associated with the relay coil K3 of another relay. Contacts K1c and K3a are connected in series between terminals 5 and 6 with the former being shunted by an arc suppressor CR13. Source S is operatively coupled through contacts K1c and K3a to the solenoid 14c of main valve 14. Only with both contacts K1c and K3a closed in solenoid 14c energized. Relay coil K3 connects from terminal 4 through a diode CR9 to terminal B with diode CR9 being arranged to conduct current in the direction from terminal B to terminal 4. Coil K3 is shunted by a capacitor C5. It will be observed that with the connection from terminal B to circuit 15 a circuit path is provided from terminal 3 through diode CR14, switch SW1, diode CR9, and relay coil K3 back to terminal 4. With this arrangement relay coil K3 is energized by the half-cycles of voltage from source S wherein terminal 3 is positive with respect to terminal 4. Thus in normal operation, relay coil K3 is always energized to similarly maintain contacts K3a closed. When the building temperature drops below that to which potentiometer RS is set, relay coil K1 is also energized, as mentioned above. Contacts K1c thus close to complete the circuit from source S to solenoid 14c. This opens valve 14. When the temperature of the building rises above that to which potentiometer RS is set, contacts K1c open thereby disconnecting source S from solenoid 14c and hence closing valve 14.

Swtich SW1 is set to open at a predetermined temperature representing an abnormally high temperature. For example, switch SW1 may be set to open at a building temperature of 95°. When switch SW1 opens coil K3 is de-energized, thereby opening contacts K3a and closing valve 14. Thus the switch SW1 provides via relay coil K3 and contacts K3a a safety feature for the heating system, and this constitutes a further inventive feature of the present disclosure. Note that modulation control and the safety feature are achieved with only three wires between circuit 15 and circuit 16.

The additional circuit components in FIG. 1 are operatively concerned with a heating/cooling system instead of a heating system by itself. Hence description of these will be postponed until coming to FIGS. 4 and 5. However, it will be noted that the number of these components is relatively small and the components are themselves relatively inexpensive. Thus it is desirable to manufacture a single control circuit module for circuit 16 wherein the illustrated construction is contained. The advantage of this construction is that once a heating system embodying control circuit 16 is installed in a building, a cooling system can later be added without need to replace control 16. All the additional circuitry for interlocking with the cooling system (except for circuit 15) are contained in circuit 16.

Turning to FIG. 3 there is disclosed a time-delay circuit 17 adapted for connection with the control circuit 16 of FIG. 2. Circuit 17 comprises resistors R16, R17, R18, R19 and R20, a capacitor C7, a unijunction transistor Q3, a silicon controlled rectifier SCR3, and a relay having a coil K4 and normally open contacts K4a.

It will be observed that a junction J2 comprising female terminals Z, Y, and X, is provided at circuit 17 to mate with a corresponding junction J1 of circuit 16 having matching male terminals Z, Y and X. When circuit 17 is thus coupled with circuit 16 the gate terminal of SCR1 connects through relay contacts K4a to terminal 3, the connection being effected via the junction terminals Z and Y. The rest of circuit 17 is connected via junction terminals X and Y in shunt with relay coil K1. Resistors R17, R18, R19 and R20, capacitor C7 and unijunction Q3 are connected in a timing circuit. This timing circuit connects to the gate of SCR3. SCR3, coil K4 and the timing circuit are connected in shunt between resistor R16 and terminal X. Circuit 17 operates to temporarily fully open modulating valve 12 when main valve 14 is initially opened. This provides maximum heat input at start up which is beneficial to performance. Circuit 17 operates in the following fashion. When coil K1 is initially energized, coil K4, which is connected in shunt therewith via resistor R16, is also energized. As a result contacts K4a immediately close shorting the gate-cathode of SCR1. Hence SCR1 cannot conduct, and coil MR remains de-energized so that valve 12 is fully open. At the same time that coil K1 energized, charge is gradually accumulated on capacitor C7 with each half cycle of line voltage wherein terminal 3 is positive with respect to terminal 4. After a predetermined time interval as established by the associated time constant of the circuit, transistor Q3 fires to in turn trigger SCR3 into conduction. Once SCR3 conducts, coil K4 is shunted and thus de-energizes opening contacts K4a. Control of SCR1 is now returned to the temperature sensing circuit 15. This condition remains until coil K1 is again de-energized. Circuit 17 can be compactly packaged from miniaturized components and provides reliable operation with minimum cost.

The advantages of the control circuit of the present invention are further highlighted and developed in a heating/cooling system as shown in FIG. 4. The heating system portion of FIG. 4 is of substantially the same construction as the heating system in FIG. 1 and it operates in the same way to heat the building space. However, in FIG. 4 circuit 15' replaces circuit 15 in FIG. 1. Additionally, in FIG. 4 a refrigeration unit R and a blower unit B' are added on to furnace F. Both refrigeration unit R and blower unit B' are operatively coupled with control circuit 16. During the cooling season, the use of burner F' is discontinued and refrigeration unit R and blower unit B' are controlled by circuit 16 in accordance with the input from circuit 15' to provide cooling to the building space which is heated by furnace F during the heating season.

Details of the electronic control circuitry in accordance with the invention for the system of FIG. 4 are disclosed in detail in FIG. 5. Since control circuit module 16 is the same in both FIGS. 2 and 5 like components thereof in both FIGURES are identified by like numerals and letters. Attention is first directed to those portions of circuit 16 which were not discussed in detail in connection with the description of FIG. 2. A normally closed contact K1b operatively associated with relay coil K1 connects between terminal C and terminal 8. A solenoid KC1 of refrigeration unit R is connected between terminals 8 and 7. An arc suppressor CR12 connects between terminals 8 and 7. When solenoid KC1 is energized, refrigeration unit R operates to cool the building space. The coil K2 of a blower relay connects from terminal 7 through a diode CR10 to terminal B. A diode CR11 connects from the junction of coil K2 and diode CR10 to contacts K1*b*. Coil K2 is shunted by a capacitor C6. Diodes CR10 and CR11 are arranged such that current can flow from terminal 4 through coil K2 either via diode CR10 toward terminal D or via diode CR11 toward contacts K1*b*. Normally open contacts K2*a* operatively associated with relay coil K2 connect in series with a solenoid KB of blower B' between terminals 3 and 4, solenoid KB being connected between terminals 9 and 10. When coil K2 is energized, contacts K2*a* close to energize solenoid KB which operates blower B'.

Circuit 15' comprises in addition to thermistor RT, resistor RU, potentiometer RS, diode CR14 and switch SW1 (which were utilized in circuit 15) a mode control switch SW2 and a blower control switch SW3. Switch SW2 is a slide type switch having a slide SL which is operative to any one of three positions. These positions are: an OFF position, indicated in solid lines and identified by the letter O above the center of the switch; a HEAT position indicated in the broken lines and identified by the letter H above the right hand side of the switch; and a COOL position, indicated by the dot-dash lines and identified by the letter C above the left hand side of the switch. Switch SW2 comprises eight terminals T1, T2, T3, T4, T5, T6, T7, and T8. Terminals T1, T4, T5 and T8 are connected together. Slide SL is operative to selectively connect certain terminals as follows: In the OFF position, contacts T2, T3, I6, and T7 are connected together by slide SL; in the COOL position, contacts T1, T2, T5, and T6 are connected together by slide SL; and in the HEAT position terminals T3, T4, T7, and T8 are connected together by slide SL.

Terminal D connects to terminal T4 and thermistor RT connects to terminal A. From consideration of FIG. 5 it can be seen that regardless of the operative position of mode switch SW2, thermistor RT, resistor RU, and potentiometer RS connect in a series circuit between terminal A and terminal D as was the case for circuit 15 in FIG. 2. Diode CR14 and switch SW1 connect from terminal T3 to terminal B with diode CR14 arranged to conduct current in the direction from terminal T3 toward terminal B. From consideration of FIG. 5 it will be seen that with slide SL in the HEAT position, diode CR14 and switch SW1 are connected in series circuit between terminal D and terminal B as was the case in the circuit of FIG. 2. Diode CR14 prevents coil K2 from being energized by half cycles wherein terminal 4 is positive relative to terminal 3. Thus with switch SW2 in the HEAT mode the overall system operates in the same way as the system of FIG. 2.

Terminal T6 connects to terminal C. Terminal T5 connects through a diode CR14' and through blower switch SW3 to terminal B. Note that the connection from terminal B to swtich SW3 and switch SW1 in unit 15' is via a single conductor. Only four conductors total are required between circuit module 15' and circuit module 16. Diode CR14' is arranged to conduct current in the direction from terminal B to terminal T5 and as will become apparent prevents the heating relay coil K3 from being energized when switch SW2 in in COOL. Switch SW3 is operative to an ON position (solid line) for rendering the operation of blower B' continuous in any operating mode and an AUTO position (broken line) for operating blower B' only when refrigeration unit R is operated. (Note that blower B' is operable in the heating mode via a conventional furnace fan switch which is not illustrated.) With switch SW2 in COOL or OFF, the circuit of diode CR14 and switch SW1 is disconnected from module 16. Hence contacts K3*a* cannot close since relay coil K3 cannot be energized. Thus valve 12 is always closed when the system is in COOL of OFF.

With switch SW2 in the COOL position, (and assuming for the moment that relay coil K1 is not energized), terminal C connects through switch SW2 to terminal B to complete a circuit from source S through solenoid KC1, contacts K1*b* and switch SW2, whereby solenoid KC1 is energized by full wave AC power from source S. When coil K1 energizes, contacts K1*b* open to interrupt the circuit from source S to solenoid KC1. Since relay coil K1 energizes when the building temperature is below that preset on circuit 15', refrigeration unit R ceases to operate when the building temperature has reached its desired value. Similarly, since coil K1 de-energizes when the building temperature rises above its desired value, refrigeration unit R commences operation when the building temperature begins to rise above its desired value. This mode of operating refrigeration unit R via relay coil K1 and contacts K1*b* is disclosed in the prior U.S. Pat. No. 3,486,693 (supra).

According to one of the inventive features of the present disclosure, control of refrigeration solenoid KC1, blower solenoid KB, modulating valve 12 and main valve 14 is attained with only four wires interconnecting module 15' with module 16. This is important in simplifying the on-site wiring procedure. This benefit arises through the unique arrangement and connection of the various circuit elements in modules 15' and 16 which constitute additional inventive features. Great versatility is achieved since desired room temperature is provided in either heating or cooling modes and blower operation can be as desired in any mode with the exception that blower operation is mandatory when refrigeration unit R is operated.

One portion of the novel circuitry of circuit 16 results in blower B' being operated whenever refrigeration unit R is operated. This is accomplished by the connection of relay coil K2 and diode CR11 in a series circuit, which series circuit is in shunt with solenoid KC1. Thus when solenoid KC1 is energized by source S as mentioned above, the half-cycles of source S wherein terminal 4 is of positive polarity relative to terminal 3 energize relay coil K2. Energization of solenoid K2 closes contacts K2*a* to energize blower solenoid KB and thereby operate blower B'.

A further feature of the circuit permits blower B' to be continuously operated when the system is in any one of its three modes. This is done via diode CR10 and switch SW3. Whenever switch SW3 is operated to the ON position, a circuit is completed from terminal 4 through relay coil K2, diode CR10, switch SW3, diode CR14' and switch SW2 back to terminal 3.

A further inventive feature resides in the utilization of a feedback circuit to improve the triggering of SCR2 when it is intended to energize relay coil K1. This feedback circuit comprises a normally open contact K1*a* which connects from terminal C through a resistor R12 and a diode CR7 to the junction of zener diode CR4 and resistor R11. As the building temperature drops below that preset on potentiometer RS, SCR2 is initially triggered via zener diode CR4 and resistor R11.

Relay coil K1 energizes and immediately contacts K1a close to connect terminal 3 through switch SW2 and contacts K1a to resistor R12. Additional gate current for SCR2 is now supplied via resistor R12 and diode CR7 to reinforce the existing gate current to SCR2. However, the additional amount of gating current supplied via the feedback circuit is such that SCR2 will become non-conductive when the building temperature again reaches substantially the temperature at which it became conductive. The particular advantage of this feedback circuit is that pulsing of solenoid KC1, and hence of the refrigeration unit R, is eliminated and this reduces wear and tear on the refrigeration unit.

In FIG. 6 there is disclosed an add-on circuit module 19 which permits the control of the present invention to be utilized in connection with a refrigeration unit having two-stage cooling. Circuit 19 comprises terminals 1, 2, 10, C, and D which connect to like terminals of circuit 16. When circuit 19 is so connected with circuit 16, circuit 19 provides control for a first cooling stage and the portion of circuit 16 described above provides control for a second cooling stage. Terminals 7' and 8' of circuit 19 connect in series circuit with source S and a first stage cooling solenoid KC2 of the two-stage refrigeration unit. Solenoid KC1 becomes the second stage cooling solenoid. The circuit construction of module 19 is generally similar to those portions of circuit 16 which are utilized to operate blower B' and refrigeration unit R. Therefore, turning to the details of circuit 19 an input voltage dividing circuit comprising serially connected resistors R21 and R22 connects between terminals 1 and 2 and hence across coil MR. A zener diode CR17 connects from the junction of resistors R21 and R22 through a resistor R23 to the gate of a silicon controlled rectifier SCR4. A capacitor C9 and a diode CR15 connect between terminal 1 and the junction of diode CR17 and resistor R23. A resistor R25 connects from terminal C through a diode CR18 to the junction of zener diode CR17 and resistor R23. A circuit comprising normally open relay contacts K5a and a resistor R24 connects in shunt with resistor R25. The parallel combination of a resistor R26 and a diode CR16 connects the cathode of SCR4 to terminal 1. The relay coil K5, with which contacts K5a are associated, connects between the anode of SCR4 and terminal C. Coil K5 is shunted by a capacitor C8. A relay coil K6 connects from terminal C through a diode CR19 and normally closed relay contacts K5b, associated with relay coil K5, to terminal 1. Coil K6 is shunted by a capacitor C10. Because of the voltage dividing action of resistors R21 and R22, SCR4 is responsive to a different voltage than is SCR2. Hence SCR4 switches between conducting and non-conducting states at a temperature different from that at which SCR2 switches between conducting and non-conducting states. The temperature at which SCR4 switches from conducting to non-conducting is lower than that at which SCR2 switches from conducting to non-conducting. Therefore as the temperature in the building space rises to that at which SCR4 becomes non-conducting contacts K5b close thereby energizing relay coil K6. Energization of relay coil K6 closes contacts K6a and K6b. Source S now energizes solenoid KC2 to operate the first stage of cooling of refrigeration unit R. Contacts K6b being connected in shunt with contacts K2a simultaneously operate blower B'. Should the first stage cooling be unable to meet the building demand, the temperature in the building will rise even further. When it reaches the temperature at which SCR2 switches from conducting to non-conducting, coil KC1 energizes to in turn energize solenoid KC1 and operate the second stage of cooling. (Note that contacts K5a also close in response to initial conduction of SCR4 to provide feedback for the gate of SCR4 when it is intended to turn off the first cooling stage.).

It should be mentioned that with the illustrated circuit constructions as disclosed in FIGS. 3 and 6, installation of both circuit 17 and circuit 19 in a single heating/cooling system control is not desirable. This is because circuit 17 would operate to temporarily turn off the first stage cooling when the second stage cooling turns off. Therefore where installation of both circuits 17 and 19 is desired, circuit 17 may be interlocked with additional switch contacts operable with mode switch SW2 whereby time-delay circuit 17 is rendered inoperative when the system is in the cooling mode.

From the foregoing description it will be appreciated that a novel, improved control circuit has been provided for heating and heating/cooling systems. In some aspects, the circuit represents an improvement in the specific type of control circuit disclosed in the above U.S. Pat. No. 3,486,693. In other aspects the control circuit represents an improvement in heating/cooling systems in general. It will also be appreciated that the specific values and sizes of circuit components can be selected in accordance with well-known design formulations, also that temperature setting potentiometer RS could be located remotely from temperature sensing thermistor RT. Furthermore, it is contemplated that the invention may be practiced in embodiments other than the preferred embodiment disclosed herein and it is to be understood that various changes and modifications may be made without departing from the spirit and scope of the invention as defined by the appended claims.

What is claimed is:

1. In a heating system for controlling the temperature in a space to be heated wherein there are provided heater means including a burner means operable from a source of gas and valve means for controlling the flow of gas from the source to the burner means comprising modulating valve means for modulating the flow of gas to the burner means in accordance with a first control signal and main valve means operable in accordance with a second control signal to a closed position wherein gas flow to the burner means is blocked and to an open position wherein gas flow to the burner means is permitted: a control system operative from an AC voltage source of electrical power for controlling said heating system comprising means for developing said first control signal from only half cycles of one polarity of said AC voltage source and for supplying the same to said modulating valve means such that said modulating valve means provides increased gas flow to the burner means as the actual temperature in the space to be heated increasingly drops below a preselected temperature for the space to be heated and decreased gas flow as the actual temperature in said space increasingly returns toward the preselected temperature and means for developing said second control signal and for supplying the same to said main valve means such that when the actual temperature in the space to be heated drops below the preselected temperature said main valve operates to the open position and when the actual temperature in said space returns substantially to the preselected temperature, said main valve operates to the closed position, said means for developing such second control signal and supplying the same to said main valve means comprising first switch means, second switch means, and means coupling said first switch means and said second switch means in series circuit with each other, said first switch means being operated to an actuated position by only half cycles of the other polarity of said AC voltage source when the temperature in the space to be heated drops below said preselected temperature and said second switch means being operated to an actuated position by only half cycles of said other polarity of said AC voltage source in response to a given system condition, said second control signal causing said main valve means to operate to the open position only when said first switch means and said second switch means are both in their actuated positions.

2. The control system of claim 1 wherein said first switch means comprises a first relay having a coil energized by only said half cycles of said other polarity of said AC voltage source when the temperature in the space to be heated drops below said preselected temperature and an associated set of switch contacts operable when said coil is energized and said second switch means comprises a second relay having a coil energized by only said half cycles of said other polarity of said AC voltage source and an associated set of switch contacts operable when said second relay coil is energized, said two sets of switch contacts being connected in series circuit and with said main valve means for causing main valve means to operate to the open position when both relay coils are energized.

3. The control system of claim 2 wherein both sets of switch contacts are open when their relay coils are not energized.

4. The control system of claim 1 including safety circuit means operatively associated with said second switch means for preventing said second switch means from being operated to its actuated position when the temperature in the space to be heated rises above a predetermined limit.

5. The control system of claim 4 wherein said safety circuit includes a temperature responsive switch responsive to temperatures in said space above said predetermined limit.

6. The control system of claim 5 wherein said temperature responsive switch opens when the temperature in said space rises above said predetermined limit.

7. The control system of claim 5 wherein said second switch means comprises a relay having a coil energized by only said half cycles of said other polarity of said AC voltage source and a set of associated switch contacts operable in response to energization of said relay coil, said relay coil being operatively coupled through said temperature responsive switch to said AC voltage source of electrical power, said set of contacts being connected in series circuit with said first switch means.

8. The control system of claim 1 wherein said means for developing said first control signal includes a temperature sensing means and a temperature setting means.

9. The control system of claim 8 including safety switch means for sensing when the temperature in said space exceeds a predetermined limit, said second switch means being operated to its actuated position only so long as the temperature sensed by said safety switch means remains below said predetermined limit.

10. The control system of claim 8 wherein said temperature sensing means, said temperature setting means, and said safety switch means are operatively coupled in said control circuit by a plurality of only three conductors.

11. In a heating system for controlling the temperature of a building space wherein there are provided a heater means including a burner means operable from a source of gas to supply heat to the building space and a valve means for controlling the flow of gas from the source to the burner means such that the flow of gas to the burner means is modulated over a range of flow rates in accordance with building demand to maintain a desired building temperature, a control system for controlling said heating system comprising a control circuit module comprising a control circuit and input circuit means for said module comprising means for sensing the building temperature, means for setting a desired building temperature, means for supplying a signal representing the difference between the set and sensed temperatures, and safety switch means for preventing flow of gas to said burner means when the temperature in the building rises above a maximum limit, said system having a plurality of only three conductors connecting said input circuit means with said control circuit module such that said heater means is operative to maintain the building temperature at the desired temperature but in the event of building temperature rising above said maximum limit said safety switch means prevents gas flow to said burner means.

12. The control system of claim 11 including a safety relay operatively coupled with said safety switch means and said valve means, said safety switch means de-energizing said safety relay to close said valve means when the building temperature rises above said maximum limit.

13. The control system of claim 11 wherein said means for sensing the building temperature and said means for setting a desired building temperature are connected in series circuit with each other and between first and second conductors of said three conductors, said safety switch means being connected between said third conductor and one of said first and second conductors.

14. The control system of claim 13 wherein said safety switch means comprises a switch having one operative condition when the building temperature is below said maximum limit and another operative condition when the building temperature is above said maximum limit.

15. The control system of claim 14 wherein said switch assumes a closed condition when the building temperature is below said maximum limit and an open condition when said building temperature is above said maximum limit.

16. The control system of claim 11 wherein said control system is operative from an AC voltage source of electrical power and said means for supplying a signal representing the difference between the set and sensed temperatures includes means for developing said last-mentioned signal from only half cycles of one polarity of said AC voltage source.

17. The control system of claim 16 wherein said last-mentioned signal is supplied from said input circuit means to said control circuit via first and second conductors of said three conductors.

18. The control system of claim 17 wherein said safety switch means is operatively coupled with said control circuit via the third conductor of said three conductors and one of said first and second conductors.

19. The control system of claim 18 wherein said safety switch means is operatively coupled with said AC voltage source to supply half cycles of said other polarity of said AC voltage source as a safety signal to said control circuit to thereby prevent the flow of gas to said burner means when the building temperature exceeds said maximum limit.

20. In a heating system for controlling the temperature of a space wherein there are provided a heater means including a burner means operable from a source of gas to supply heat to the space and a valve means for controlling the flow of gas from the source to the burner means such that the flow of gas to the burner means is modulated over a range of flow rates in accordance with demand at said space to maintain a desired temperature within said space, a control system for controlling said heating system comprising a control circuit module comprising a control circuit and input circuit means for said module comprising means for sensing the temperature in said space, means for setting a desired temperature in said space, means for supplying a signal representing the difference between the set and sensed temperatures, and safety switch means for limiting flow of gas to said burner means when the temperature in said space rises above a maximum limit, said system having a plurality of only three conductors connecting said input circuit means with said control circuit module such that said heater means is operative to maintain the temperature in said space at the desired temperature but in the event that the temperature in said space rises above said maximum limit said safety means operates to limit gas flow to said burner means.

21. The control system of claim 20 wherein said means for sensing the temperature in said space and said means for setting a desired temperature in said space are connected in series circuit with each other and between first and second conductors of said three conductors, said safety switch means being connected between said third conductor and one of said first and second conductors.

22. The control system of claim 21 wherein said safety swtich means comprises a switch having one operative condition when the temperature in said space is below said maximum limit and another operative condition when the temperature in said space is above said maximum limit.

23. The control system of claim 22 wherein said switch assumes a closed condition when the temperature in said space is below said maximum limit and an open condition when the temperature in said space is above said maximum limit.

24. The control system of claim 20 wherein said control system is operative from an AC voltage source of electrical power and said means for supplying a signal representing the difference between the set and sensed temperatures includes means for developing said last-mentioned signal from only half cycles of one polarity of said AC voltage source.

25. The control system of claim 24 wherein said last-mentioned signal is supplied from said input circuit means to said control circuit via first and second conductors of said three conductors.

26. The control system of claim 25 wherein said safety switch means is operatively coupled with said control conduit via the third conductor of said three conductors and one of said first and second conductors.

27. The control system of claim 26 wherein said safety switch means is operatively coupled with said AC voltage source to supply half cycles of said other polarity of said AC voltage source as a safety signal to said control circuit to thereby prevent the flow of gas to said burner means when the temperature in said space exceeds said maximum limit.

28. In a heating system for controlling the temperature of a space wherein said system includes a heater means including burner means operable from a source of gas to supply heat to said space and valve means for controlling the flow of gas from said source of gas to said burner means in accordance with a valve control signal such that the flow of gas to said burner means is modulated over a range of flow rates in accordance with demand at said space to maintain a desired temperature at said space, a control system for controlling said heating system comprising: a control circuit for supplying said valve control signal for said valve means; input circuit means; means operatively coupling said input circuit means with said control circuit comprising a plurality of only three conductors; said input circuit means including means for supplying via first and second of said three conductors a first input signal representing the difference between a desired temperature in said space and the actual temperature in said space and means for supplying via the thire of said three conductors and one of said first and second conductors a second input signal representing a predetermined temperature condition in said space; said control circuit having means responsive to said input signals for causing said valve means to be modulated in accordance with said first input signal so long as said predetermined temperature condition does not occur in said space for causing said valve means to limit gas flow to said burner means when said predetermined temperature condition occurs in said space.

29. The control system of claim 28 wherein said means for supplying said second input signal comprises a safety switch means for sensing when the temperature in said space exceeds a predetermined maximum limit, said safety switch means causing said valve means to limit gas flow to said burner means when said maximum temperature is exceeded in said space.

30. The control system of claim 28 wherein said control system is operative from an AC voltage source of electrical power and at least one of said input signals is derived from only half cycles of one polarity of said AC voltage source.

31. The control system of claim 30 wherein one of said input signals is derived from only half cycles of one polarity of said AC voltage source and the other of said input signals is derived from only half cycles of the other polarity of said AC voltage source.

* * * * *